United States Patent [19]

Lévy et al.

[11] 4,139,315

[45] Feb. 13, 1979

[54] BOLTED PLATE JOINT

[75] Inventors: Jacques Lévy, Paris; Jean-Luc Viaud, Bures sur Yvette, both of France

[73] Assignee: Commissariat a l'Energie Atomique, Paris, France

[21] Appl. No.: 858,343

[22] Filed: Dec. 7, 1977

[30] Foreign Application Priority Data

Dec. 15, 1976 [FR] France .................................. 76 37743

[51] Int. Cl.² ............................................. F16B 5/02
[52] U.S. Cl. ........................................ 403/19; 403/188; 403/388; 151/41.72; 151/41.74; 176/78; 176/87
[58] Field of Search ...................... 176/78, 87; 403/11, 403/21, 25, 42, 188, 19, 388, 406, 407; 85/32 K; 151/41.72, 41.74, 28, 29, 53

[56] References Cited

U.S. PATENT DOCUMENTS

| | | | |
|---|---|---|---|
| 2,050,961 | 8/1936 | Olson | 151/53 UX |
| 2,907,418 | 10/1959 | Hudson et al. | 403/21 |
| 3,209,806 | 10/1965 | Currier et al. | 151/41.74 X |
| 3,560,132 | 2/1971 | Gulistan | 151/41.74 X |
| 3,868,806 | 3/1975 | Dey | 403/406 |
| 3,886,707 | 6/1975 | Heldt | 403/407 |
| 4,012,157 | 3/1977 | Krause et al. | 151/53 X |
| 4,063,831 | 12/1977 | Meuret | 176/87 X |

Primary Examiner—Wayne L. Shedd
Attorney, Agent, or Firm—Cameron, Kerkam, Sutton, Stowell & Stowell

[57] ABSTRACT

In an assembly of two parts having flat assembly faces, the upper part has a bore provided with an ovalized orifice and the lower part has an internally-threaded bore, the two bores being coaxial when the parts are in the assembly position. A first connecting member has a threaded end in cooperating relation with the internally-threaded bore and a second connecting member has a portion in contact with one face of the upper part. One member has an ovalized portion which cooperates with the ovalized orifice and has a deformable portion which cooperates with the other member after crimping in order to secure the two members at least against rotational motion.

6 Claims, 4 Drawing Figures

FIG. 2a
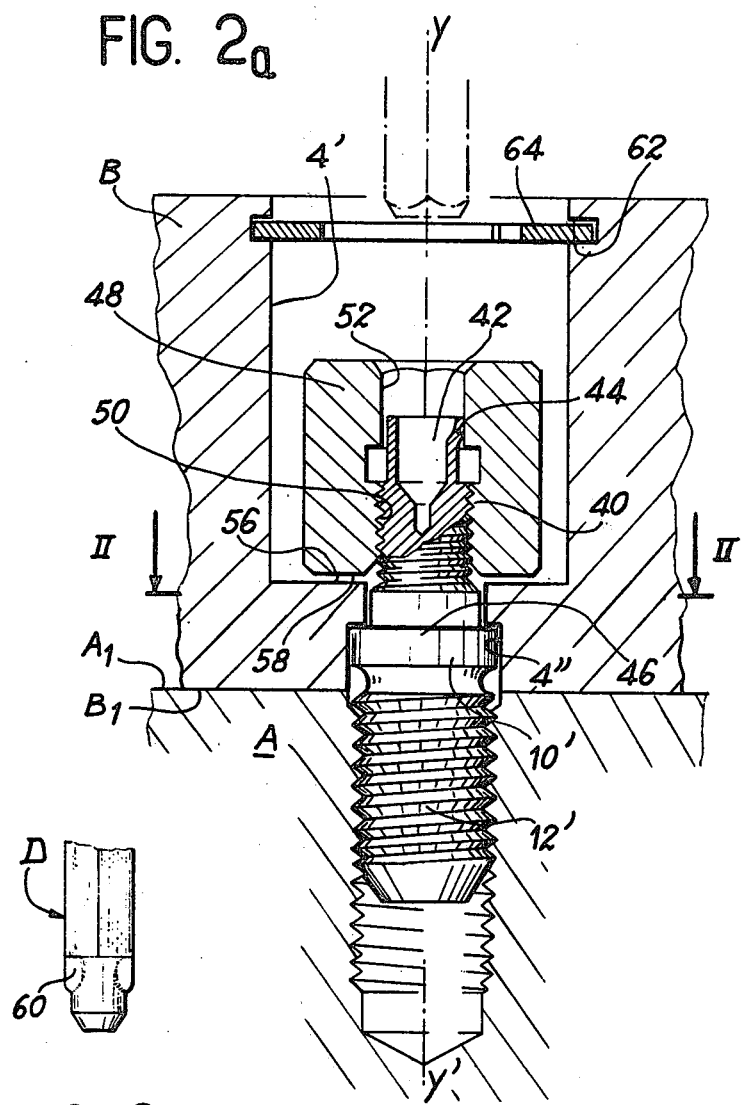
FIG. 2c
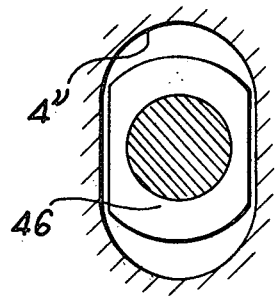
FIG. 2b

BOLTED PLATE JOINT

This invention relates to an assembly of two parts.

More specifically, this invention relates to the assembly of two parts each having a flat assembly face by means of an assembly device which permits remote separation of these two parts.

In even more exact terms, the present invention relates to an assembly of two parts having flat contacting faces in which said assembly is formed by means of lock screws and has the following distinctive features:

The members constituting said assembly are self-retaining or, in other words, the components of the assembly elements cannot escape from the assembly zone even in the event of failure of said assembly elements. Furthermore, said assembly permits relative displacement of one part with respect to the other, for example under the action of differential thermal expansions of the two parts which can be of the order of 1 mm.

Stringent conditions of this order as applied to an assembly are essentially encountered in the nuclear engineering field. This is the case especially in the connection of certain elements of the internal structure of a nuclear reactor such as a pressurized-water reactor, for example. One application which can be mentioned by way of example is the attachment of casings or so-called wrappers containing reactor core fuel assemblies to the grid which supports said wrappers and is placed within the reactor vessel. In this connection, useful reference can be made, for example, to French Pat. No EN 75 30 244 filed in the name of the present Applicant in respect of "Internal structure for nuclear reactors".

It is understood that in this case the three conditions laid down are absolutely imperative. If it is desired to replace the fuel wrappers, provision must clearly be made for the possibility of remote detachment of the fuel wrappers from the support grid, this operation being performed from the exterior of the reactor vessel. Furthermore, the components of the support grid and the fuel wrappers are usually fabricated from materials having substantially different coefficients of thermal expansion. For example, the support grid is formed of stainless steel whereas the wrappers are formed of Zircaloy.

Finally, it is readily apparent that, in the event of accidental failure of the assembly, elements or parts of assembly elements are liable to fall into the reactor vessel and this would have an extremely unfavorable effect on the good operation of the reactor. Such an occurrence could also cause subsequent damage to certain parts of the reactor or obstruction of orifices, for example at the level of the primary pumps, or cause elements to be left free and exposed to radiation.

The present invention is precisely directed to an assembly of two parts which has all these distinctive features while being of relatively simple design and particularly well suited for the purpose of securing fuel wrappers to the support grid.

The assembly of two upper and lower parts respectively in which the assembly faces of the parts are flat is distinguished by the fact that the upper part has a bore provided in the vicinity of the assembly face with an orifice which is ovalized over part of its height whilst the lower part is provided with an internally-threaded bore, the two bores being substantially coaxial when the parts are in the assembly position. The assembly device further comprises a first connecting member and a second connecting member. The first member has a threaded end which cooperates with said internally-threaded bore whilst the second member has a portion in contact with one face of the upper part which is opposite to the assembly face. One member aforesaid has an ovalized portion which cooperates with the ovalized orifice with allowance for a clearance space. One member aforesaid has a deformable portion which cooperates with the other member after crimping in order to secure the two members at least against rotational motion.

In a first embodiment, the first member is constituted by a screw in which the threaded portion cooperates with the internally-threaded bore. Said screw has a head provided with an orifice which is adapted to cooperate with a screwing tool, said head being provided with a bevelled surface over part of its periphery. The second member is constituted by a cylindrical sleeve provided with an axial bore which is adapted to receive the stem of said screw, said sleeve being provided with two annular flanges consisting respectively of an upper and lower flange and capable of cooperating with two grooves formed on each side of said ovalized orifice. Said sleeve has an upper deformable cylindrical portion which surrounds the head of said screw with provision for a clearance space when said screw is tightened, said cylindrical portion being intended to be deformed in order to cooperate with said bevelled surface. It is understood that, at the time of positioning of the second part, the screw is already engaged within the sleeve, thus dispensing with the need to handle the screw alone.

In a second embodiment, the first member is constituted by a stud having a lower threaded portion adapted to cooperate with the internally-threaded bore and having an upper threaded portion, an ovalized annular flange being disposed between said two threaded portions and adapted to cooperate with said ovalized orifice. The upper end of said stud is constituted by a recess which is adapted to cooperate with a crimping tool and the top edge of which is deformable. The second member is constituted by a nut in which the axial bore has an internally-threaded lower portion adapted to cooperate with the upper threaded portion of said stud and an upper portion provided with flat surfaces adapted to cooperate with a screwing tool. Said edge of said recess is capable of undergoing deformation in order to be crimped in the top portion of the nut which is provided with the flat surfaces aforesaid.

It is apparent that, in this embodiment, the stud is already in position within the lower part when the upper part is presented for the interlocking operation.

In this case, the device comprises a stop (washer, locking-pin, key and so forth) which can be inserted in a groove formed in the bore of the upper part and prevents the nut from escaping from said bore.

A more complete understanding of the invention will in any case be obtained from the following description of two examples of construction of the assembly device, reference being made to the accompanying drawings, wherein:

FIGS. 2a, 2b and 2c are views of a second embodiment of the assembly device and illustrate the tool for crimping the assembly, wherein FIG. 2a is a vertical sectional view, FIG. 2b is a horizontal sectional view taken along the plane II—II of FIG. 2a and FIG. 2c is a view in perspective of the crimping tool.

Figure 1:
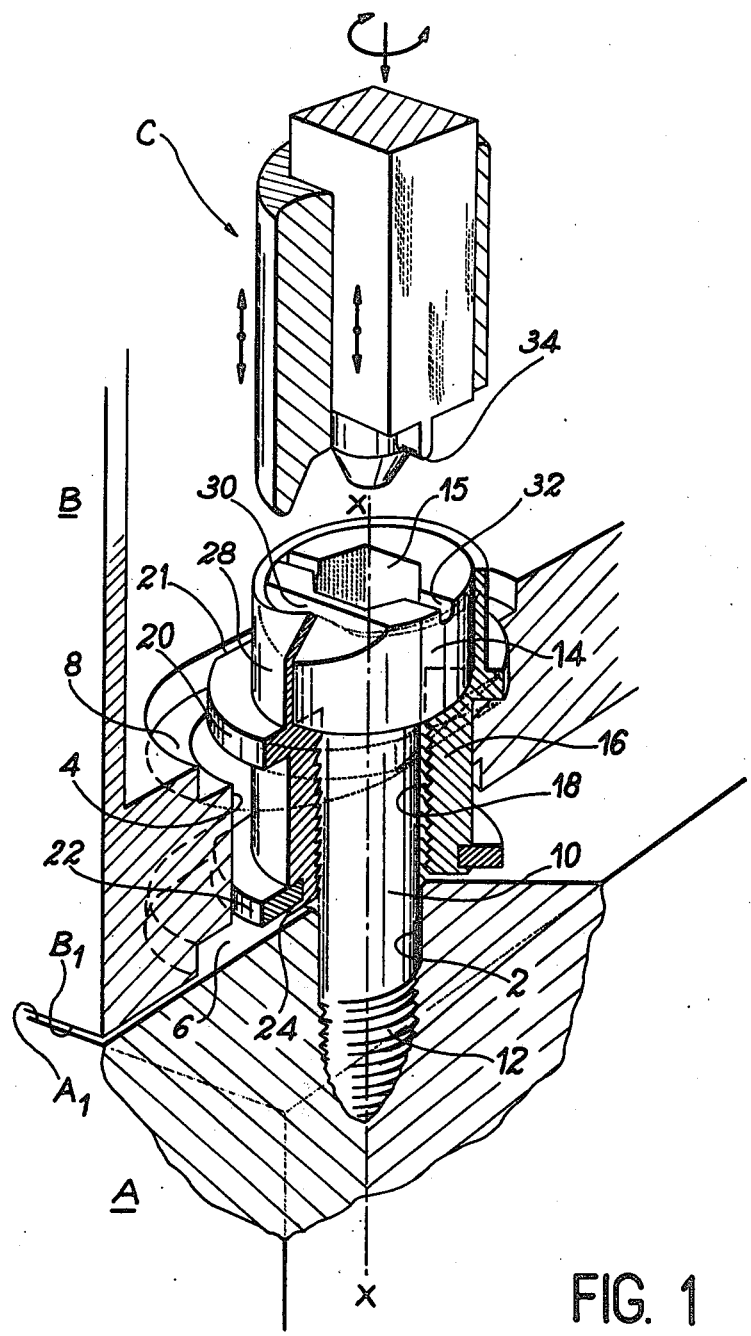
FIG. 1 is a vertical sectional view in perspective which shows a first embodiment of the invention and also illustrates a crimping tool of the assembly device.

FIG. 1 shows a first embodiment of the assembly device. The part A or so-called lower part and the part B or so-called upper part are shown in process of assembly. The contacting faces of the assembly are designated respectively by the reference A1 in the case of the part A and the reference B1 in the case of the part B. The part A is provided with an internally-threaded bore 2 having a vertical axis. The part B is provided at its lower end with an ovalized bore 4. The term ovalized is intended to mean that the dimensions of the bore 4 along the section plane are larger than its dimensions in a plane at right angles to the section plane. However, the internally-threaded bore 2 and the ovalized bore 4 have a common axis of symmetry X—X'. The bore 4 is provided with a groove 6 in the face B1 of the part B and with a groove 8 in the face located opposite to the face B1, said grooves being also ovalized.

In this embodiment, the assembly comprises a first member 10 constituted by a screw having a threaded portion 12 which cooperates with the internally-threaded portion 2 of the part A and by a head 14 having a hexagonal recess 15. The second member of the assembly element is constituted by a sleeve 16 of cylindrical shape. A bore 18 is formed within said sleeve and provided over part of its height with a threaded portion through which the screw 10 can be passed. The top portion of said sleeve is provided with an ovalized annular flange (with two flat surfaces, only the flat surface 21 being visible in the figure) which cooperates with the top groove 8. Said sleeve 16 is provided at the lower end with a second added annular flange 22 which is rigidly fixed to the sleeve 16 by crimping of this latter on said annular flange 22. Said lower end is shown in the figure after the crimping operation has been completed and is designated by the reference numeral 24. The sleeve 16 is provided at the upper end, that is to say above the annular flange 20, with a cylindrical portion 28 of small thickness which surrounds the head 14 of the screw 10. It is apparent that the ovalized shape of the bore 4 and the ovalized shape of the annular flanges 20 and 22 which cooperate with the grooves 8 and 6 permit translational motion of the part B with respect to the sleeve 16, thus in turn permitting of thermal expansion. By means of a tool designated by the general reference C, said cylindrical portion 28 of the sleeve 6 can be deformed and crimped on a bevelled portion of the head 14 of the screw 10.

The practical application of this first embodiment of the assembly device takes place in the manner which will now be described below.

The sleeve 20 is introduced into the bore 4 prior to positioning of the part B. The annular component 22 is placed in position and the lower end 24 of the sleeve 16 is crimped by means of a special tool (not illustrated) in order to secure said sleeve to the annular component 22. In consequence, the sleeve 16 is imprisoned within the orifice 4 of the part B. The screw is pre-positioned on the threaded portion of the sleeve 16 in readiness for screwing into the part A. The part B is then placed in position with respect to the part A by aligning the axes of the screw 10 and of the internally-threaded bore 2. At the time of presentation of the part B, the axis of the sleeve 16 is slightly displaced with respect to the axis of the bore 4 in the direction corresponding to the main direction of differential expansion of the parts A and B. By means of the hexagonal recess 15, the screw 10 is rotated in order to pass this latter through the sleeve 16 and then screwed into the internally-threaded bore 2 so that the head 14 of said screw is applied against the upper end of the sleeve 16. There is accordingly applied a limited tightening torque which is chosen as a function of the permissible slippage between the parts A and B. The following operation consists in crimping a portion of the cylindrical sleeve element 28 on the bevelled surface 30 of the head 14 of the screw 10 by means of the tool C. In order to locate the position of the tool C for this crimping operation, the screw head 14 is provided with a diametral locating groove 32 which cooperates with a diametral rib 34 of the tool C.

It is apparent that the part B is capable of displacement with respect to the part A by virtue of the cooperation of the ovalized bore 4 and of the sleeve 16. Furthermore, since the sleeve 16 is locked in rotational motion with respect to the part B and the screw 10 is locked both in rotational motion and in translational motion with respect to the sleeve 16, the screw 10 cannot become "unscrewed". Moreover, in the event of failure of the stem of the screw 10, the screw head is maintained in position as a result of crimping of the cylindrical portion 28 on said screw head.

In order to disconnect this assembly, it is only necessary to introduce a tool into the hexagonal recess 15 and to force the crimp obtained as a result of cooperation of the bevelled surface 30 with the cylindrical portion 28 in order to obtain remote separation of the parts A and B.

There is shown in FIG. 2 a second embodiment of the invention in which the part A is again provided with an internally-threaded bore 2. The part B in this case is provided with a cylindrical bore 4' which terminates near the bottom face A1 of said part in an ovalized bore 4" of small size. The assembly device comprises a first member constituted by the stud 10', the threaded lower end 12' of which cooperates with the internally-threaded orifice 2 formed in the part A. It is readily apparent that, when the parts A and B are in the assembly position, the bores 4' and 2 have a common axis Y—Y'. The stud 10 terminates at the upper end in a threaded top portion 40 of smaller diameter which terminates at the upper end in a hexagonal recess 42, the top edge 44 of which is deformable. The threaded portions 12' and 40 are separated by an ovalized annular flange 46 which cooperates with the ovalized bore 4" formed in the part B. The second member of the assembly device is constituted by the nut 48 provided internally and over part of its height with the screw-thread 50 which is capable of cooperating with the upper threaded portion 40 of the stud 10'. The top porton of the nut 48 is provided with a hexagonal recess 52.

The practical application of this embodidment of the assembly takes place in the manner described hereinafter.

A first step in which the part B has not yet been placed in position consists in screwing the stud 10' into the part A by means of a tool which cooperates with flat surfaces of the annular flange 46. Said stud is tightened hard up and then slackened-off for a fraction of a turn in order to ensure that the flat surfaces of the annular flange are suitably oriented. The part B is presented after the stud 10' has been fitted in position, the ovalized annular flange being in a position such that this latter penetrates into the ovalized bore 4" of the part B. The nut 48 which is imprisoned in the bore 4' is screwed by means of its hexagonal recess 52 on the upper screw-thread 40 of the stud 10' with a low value of torque which is chosen as a function of the permissible slippage between the parts A and B as a result of differential expansion. The next step consists in deforming the upper end 44 of the hollow head 42 of the stud 10' by means of the tool shown in FIG. 2c in order to crimp said head within the hexagonal recess 52 of the nut 48. The tool D shown in FIG. 2c has forming faces 60 for carrying out said crimping operation in an effective manner. Prior to positioning of the part A, an annular member 64 whose design function will be explained below has been placed (outside the reactor) within a groove 62 formed in the top portion of the bore 4'. The distance between the top face of the nut 48 (in the screwed position) and the annular member 64 is at least equal to the screwing height H of the nut 48.

In FIG. 2a, the upper end of the stud 10' is shown prior to assembly on the left-hand side of the figure and the upper end 44 of the stud 10' is shown after completion of the crimping operation on the right-hand side of the figure.

The mode of action of this device can readily be understood. By virtue of the crimping operation performed on the top portion of the stud 10' within the nut 48, said nut 48 is secured against rotational motion with respect to the stud 10'. Moreover, by virtue of the cooperation of the annular flange 46 and the ovalized bore 4" of the part B, the stud 10' is locked rotationally with respect to said part B. In consequence, the stud 10' cannot become unscrewed from the part A and the nut 48 cannot become unscrewed with respect to the stud 10'. By reason of the fact that the nut 48 is screwed without excessive tightening against the face 56 of the bore 4" and by virtue of the ovalization of said bore 4", the part B is capable of displacement in translational motion in the direction of the longitudinal axis of the bore 4" with respect to the part A under the action of differential expansions.

Furthermore, by virtue of the annular member 64 whose internal diameter is smaller than the external diameter of the nut 48 but larger than that of the tool, said nut necessarily remains within the bore 4' in the event of failure of the stem of the stud 10'. Said annular member therefore performs the function of a stop.

All the conditions set forth in the foregoing are thus satisfied. In order to uncouple this assembly, it is only necessary to introduce a tool into the hexagonal recess 52 and to force the assembly in order to obtain uncrimping of the top edge 44 of the stud 10'. This has the effect of uncoupling the nut 48 from the threaded portion 40 of the stud 10' and also has the effect of separating the parts A and B at the same time.

By way of example, the use of assembly devices of this type within the internal structures of nuclear reactors has been mentioned in the foregoing. It can readily be understood that the assembly in accordance with the invention can be employed in other types of installation provided that the same particular conditions are imposed, especially when it proves necessary to carry out remote connection and disconnection of said assembly.

What we claim is:

1. An assembly of two upper and lower parts respectively each having a flat assembly face, wherein the upper part has a bore provided in the vicinity of the assembly face with an orifice which is ovalized over part of its height whilst the lower part is provided with an internally-threaded bore, the two bores being coaxial when the parts are in the assembly position and wherein the assembly further comprises an assembly device constituted by a first connecting member and a second connecting member, the first member being provided with a threaded end in cooperating relation with said internally-threaded bore whilst the second member is provided with a portion in contact with one face of the upper part which is opposite to the assembly face, one member aforesaid being such as to have an ovalized portion in cooperating relation with the ovalized orifice with provision for a clearance space, one member aforesaid being such as to have a deformable portion in cooperating relation with the other member after crimping in order to secure the two members at least against rotational motion.

2. An assembly according to claim 1 comprising an upper part and a lower part to be assembled and a device for the assembly of said parts, each part being such as to have a flat assembly face, the upper part being such as to have a bore provided with an ovalized orifice in which is formed a bottom groove having its opening in the assembly face and a top groove having its opening in said bore, the lower part being provided with an internally-threaded bore having its opening in the assembly face, the assembly device being provided with a first member constituted by a screw having a head, a stem and a threaded bottom portion adapted to cooperate with said internally-threaded bore, said head being provided with a blind-end bore adapted to cooperate with a crimping tool and with a bevelled surface over part of its periphery, and a second member constituted by a sleeve introduced into said ovalized bore and provided with a top annular flange adapted to cooperate with the top groove and a bottom annular flange adapted to cooperate with the bottom groove, said sleeve being such as to have a deformable cylindrical portion forming an extension of said sleeve above the top annular flange, the diameter of said cylindrical portion being larger than that of the head of said screw, said cylindrical portion being deformable in order to cooperate with said bevelled surface.

3. An assembly according to claim 2, wherein each annular flange has two flat surfaces parallel to the long dimension of the ovalized orifice.

4. An assembly according to claim 2, wherein the bottom annular flange is joined to the sleeve by crimping.

5. An assembly according to claim 1 and comprising an upper part and a lower part to be assembled, each part being provided with an assembly face and an assembly device, the upper part being provided with a bore in communication with an ovalized orifice having its opening on the assembly face, a lower part provided with an internally-threaded blind-end bore, the assembly device being provided with a first member constituted by a stud having a head at the upper end thereof, a bottom threaded portion, a top threaded portion and an ovalized annular flange between said threaded portions, said bottom threaded portion being adapted to cooperate with said internally-threaded blind-end bore, said annular flange being adapted to cooperate with said ovalized orifice, said head being intended to constitute an internal recess whose top edge can be deformed by a tool, and a second member constituted by a nut provided with an axial bore whose lower end is provided with an internal screw-thread and whose upper end is provided with flat surfaces, the internally-threaded bottom portion being adapted to cooperate with the top threaded portion of said stud, the top portion being adapted to cooperate with a screwing tool, the deformable portion of said internal recess being intended to be crimped within the top portion of said nut after deformation.

6. An assembly according to claim 5 and comprising a stop adapted to be introduced into the bore of the upper part, only a portion of the bore of the upper part being left free by said stop which has a smaller diameter than the diameter of the nut while permitting insertion of the tool.

* * * * *